Sept. 13, 1966 W. G. STROHM ETAL 3,273,131

QUEUE REDUCING MEMORY

Filed Dec. 31, 1963 4 Sheets-Sheet 1

INVENTORS
WILLIAM G. STROHM
ERNESTO F. YHAP

ATTORNEY

Sept. 13, 1966 W. G. STROHM ETAL 3,273,131

QUEUE REDUCING MEMORY

Filed Dec. 31, 1963 4 Sheets-Sheet 2

QUEUE REDUCING MEMORY

Filed Dec. 31, 1963

Sept. 13, 1966 W. G. STROHM ETAL 3,273,131

QUEUE REDUCING MEMORY

Filed Dec. 31, 1963 4 Sheets-Sheet 4

United States Patent Office 3,273,131
Patented Sept. 13, 1966

3,273,131
QUEUE REDUCING MEMORY
William G. Strohm, Yorktown Heights, and Ernesto F. Yhap, New York, N.Y., assignors to International Business Machines Corporation, New York, N.Y., a corporation of New York
Filed Dec. 31, 1963, Ser. No. 334,761
16 Claims. (Cl. 340—172.5)

The present invention relates to a method and apparatus for handling a plurality of different data sources being fed to a central computing station. More particularly, it relates to such a method and apparatus wherein the queuing time for such sets may be materially reduced and wherein said incoming information is stored in a variable field length unallocated serial memory.

There is a present growing demand for the services of an electronic computer by more and more customers such as commercial establishments seeking to keep careful control of inventory and also of personnel records and the like. It is also very convenient for such customers to be able to phone in information to a large central computing facility wherein their basic records can be maintained in a tape storage or the like and wherein the central computer may be utilized to solve their problems on a relatively rapid demand basis. However, the nature of such customers prohibits the ownership of a large computer of even the use of a permanent tie line to such a computer which is always "on" or ready to receive information. Systems have been envisioned in the past wherein such customers can call in on special lines rented from the telephone company capable of handling standard electronic data in the form of binary coded bits of information and this information is fed to the computer when the computer is not currently performing another problem. However, with a plurality of customers, say several hundred, feeding into one computer location, obviously many waiting problems will be involved wherein a calling customer will either receive a busy signal and hang up and wait until some subsequent time when he no longer receives such a busy signal or will have to hold his wire open until he gets a signal that the computer is no longer busy and can go ahead. If a number of such incoming calls are received, each one would assumedly receive a queue number or a relative position rating in the line of input so that the computer would handle incoming requests sequentially. This has a number of obvious limitations as from a commercial standpoint it is quite annoying to customers to have to wait and perhaps hold the line for as much as fifteen minutes to half an hour. To solve this problem in the past, certain types of queue reducing memories have been suggested wherein each incoming terminal station or line has an assigned section of a temporary buffer memory wherein the particular information requested can be stored and subsequently acted on by the computer. However, all of these previous systems have assigned specific amounts of memory to each station and in each instance, the field length of various data questions is limited to a certain number of characters per machine word and generally to a certain number of words per total message or storage allocation. Such a system is both wasteful of machine storage and also, imposes unnecessary limitations upon the flexibility of the questions which a subscriber may ask of the computer.

As stated previously, when a large number of terminal sets or input lines from a substantial number of customers are to be serviced, the rigid allocation of memory space per terminal is undesirable if the mean number of sets in operation at any given time is a small percentage of the total number of existing sets to be serviced, or the processing unit is only able to handle a portion of the terminals at a time. The rigid allocation of memory makes no allowance for the statistical distribution of use which will allow a smaller memory to be used if it is taken into account. The use of a high speed serial memory wherein storage locations are unallocated and which is further capable of receiving and storing variable field lenth messages results in a number of advantages. The first and most obvious advantage of such a system is the reduction in total memory cost since a greater usage of the memory at any one time is achieved. Secondly, high speed of such memories allows multiplexing equipment to be used with the system having a much higher operating speed than would be possible with prior art systems wherein every message would have to be switched into a particular portion of an allocated memory.

With the above considerations in mind, it has now been found that a high speed serial queue reducing memory can be achieved utilizing certain high speed serial memory devices such as delay lines of various types having the associated logic circuitry necesssary for assembling individual characters into messages in said delay line and providing for the systematic removal thereof from same. It has further been found that the main high speed serial memory of the present system can easily be added onto with readily available modular blocks with very little attendant change in the control circuitry necessary in adding said modules. Thus, a previous installed system can be relatively easily modified to double, triple and/or quadruple its capacity with a minimum amount of modification of the existing equipment.

It is accordingly a primary object of the present invention to provide a queue reducing memory for use as an interface system between a central computing station and a large number of terminal sets feeding information and requests into said central system.

It is a further object of the invention to provide such a memory wherein messages are stored therein in an unallocated manner and may be of variable field length.

It is yet another object to provide such a memory using a high speed recirculating serial memory of the delay line variety.

It is a further object of the invention to provide such a memory system into which a plurality of messages may be concurrently stored in said memory during the same memory cycle in which another message is being removed therefrom.

It is another object to provide the necessary logic and control circuitry for automatically scanning the contents of the memory at any one time and selecting a proper location for the storage of a new message therein, for the continuation of a message and for reading the message out of said memory upon demand.

The foregoing and other objects, features and advantages of the invention will be apparent from the following more particular description of preferred embodiments of the invention, as illustrated in the accompanying drawings.

Figure 1:
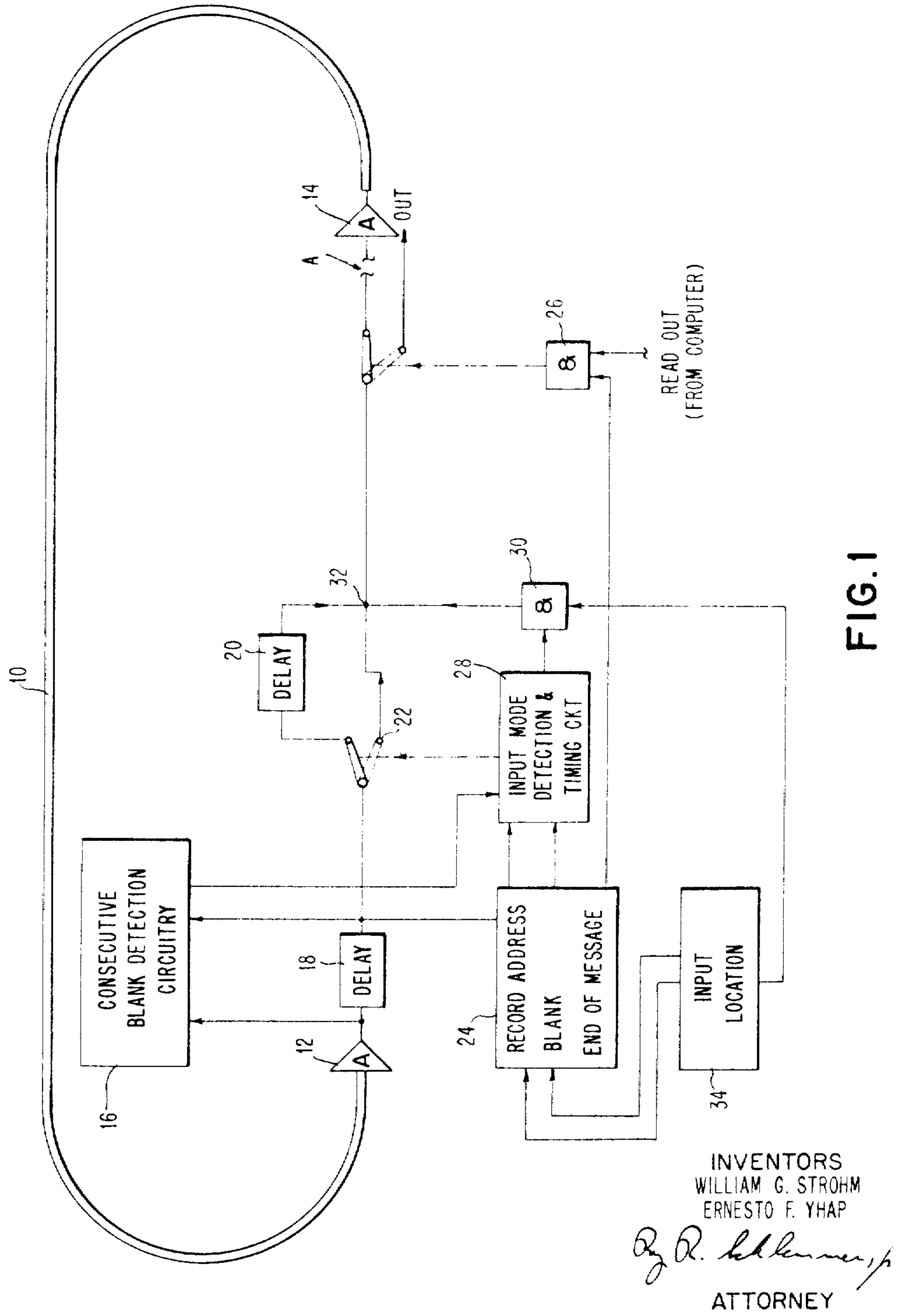
FIGURE 1 is a block diagram of the system illustrating the principal functional components including the main recirculating serial memory and the major control blocks necessary for the operation thereof.

The objects of the present invention are accomplished in general by a method for storing messages in a high speed recirculating serial memory wherein it is desired to separate all messages by at least one "blank" character comprising initially searching for two adjacent "blank" character locations in said memory, storing a first character in the second "blank" location and delaying all subsequently stored characters by one character time in said memory until two more "blank" locations are detected, whereupon the two "blank" locations are merged and the delay is removed.

The reading out of information from said memory comprises detecting a special "end of message" character stored with each complete message and gating all of said message associated therewith out of said memory serially until a subsequent "blank" character following the last character of said message is detected, filling all spaces in said memory previously filled with message characters with "blank" characters and recirculating the remainder of said information in said memory.

The apparatus for performing the above methods comprises essentially, a high speed delay line memory of the ultrasonic type having suitable sense and drive amplifiers. Inserted between these amplifiers are suitable control circuitry for detecting the desired memory conditions as will be pointed out more fully subsequently such as sequences of "blank" characters, "record addresses" and "end of message" characters. Upon the detection of suitable storage locations in the memory, this control circuitry provides for the insertion of message characters into said memory in the proper order and when necessary, provides for the shifting of previously stored information backwards in said memory to make room for the new message. All of the individual circuit components of the control circuitry utilized in the present system are conventional. For example, flip-flops, AND circuits, exclusive OR circuits, delay circuits, OR circuits and single shots are well known in the art. Any of these circuits could be implemented either in electronic tube circuit configurations or in semiconductor components such as transistors, diodes and the like. For exemplary circuits capable of performing these functions, reference is generally made to "Digital Computer Components and Circuits," by R. K. Richards, D. Van Nostrand Co., Inc., 1957.

Before proceeding further with the description of the invention, it would perhaps be well to state that the type of high speed recirculating serial memory may be of any suitable type as, for example, a magnetostrictive delay line comprising a length of wire formed in a configuration to provide a time delay to an electrical input pulse. As is known, an input electrical pulse is converted by a suitable known transducer (not shown) to an acoustical signal at the input of the delay line and this acoustical signal is propagated at the speed of sound through the line to the other (or output) end of the delay line where the acoustical pulse is converted to an electrical pulse by a suitable drive amplifier and transducer. Suitable transducers which may be used in the circuit of the present invention are disclosed in the application Ser. No. 192,894 now Patent No. 3,177,450 of N. S. Tzannes et al., entitled Delay Line Transducers, which application is assigned to the same assignee as the present invention.

The delay line might also be of glass or quartz arranged in a configuration to provide a suitable delay as also is well known in the art. The operation of delay line circuitry of the invention is similar for either magnetostrictive glass or quartz types of lines.

A suitable commercial delay line for use with the present invention would be a Deltine Type 174 having a storage capacity of 5000 bits and a recirculation rate of 1 megacycle. In other words, the delay line completely recirculates 200 times a second and all 5000 bits, of course, would pass through the sense and drive amplifiers and any interim circuits in $\frac{1}{200}$ of a second. It may thus be seen that a very large number of, for example, 6 bit characters, made up into any convenient message units, can be stored in this memory.

Figure 3:
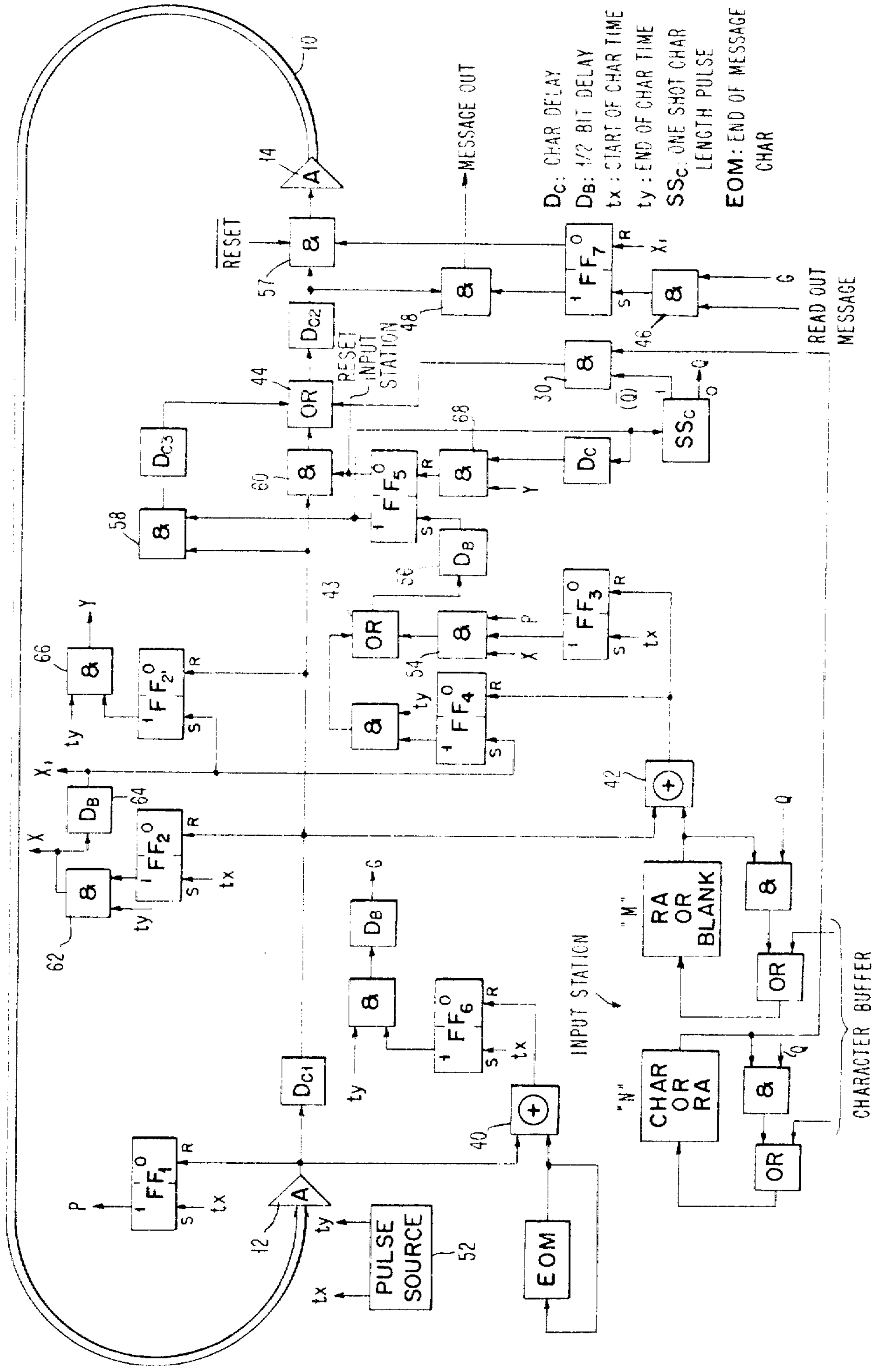
FIGURE 3 is a logical schematic diagram of a preferred embodiment of the invention illustrating a single input station.

It should also be noted that only one character can be gated into any one message in the delay line memory during any one operating cycle or recirculating time for the delay line in the embodiment of the invention disclosed in FIGURE 3. However, it normally takes about a second to gate 20 characters into a suitable input register at the input station so it may readily be seen that the speed of the delay line and its associated control circuitry will be able to take care of a great many of input terminals without occasioning any delay at any of the input terminals other than the actual time to gate information from their input lines into the terminal registers.

Any data, i.e., messages to be stored in the present system must contain a minimum of three items, first is the "record address" which is a special character utilized to identify the particular input terminal location from which a given message is being received and to which the answer will subsequently have to be returned. The second item is any one of a large number of possible characters, whether they be numerical or alphabetical in nature. And the third is a special "end of message" character which must accompany each message fed into the system and which identifies the end of said message. This latter character is utilized in the system to locate complete messages stored therein to initiate read out of information from the memory as will be apparent from the subsequent description.

Another criteria imposed upon the messages as stored, although this is primarily a criteria of this system rather than the input information, is that a "blank" character must precede every "record address" and the "record address" is the first character appearing in any message unit. The "end of message" character immediately succeeds the "record address" character and the actual message characters follow the "end of message" unit. It will also be noted that the actual message characters will be read out of the system in the inverse order of their storage in the system. Thus, every message stored in the system will be separated by at least one "blank" character since, as stated, each "record address" which is the first character in any given message must be preceded by such a "blank" character.

In the subsequent description of the invention, the letters R.A. are intended to refer to a "record address," i.e., a terminal unit identification character. The term E.O.M. refers to an "end of message" character. The letter C refers simply to any alphanumeric character as may be encountered in a message unit other than the above E.O.M. or R.A. character. Also, a "blank" character is utilized in the present system, however, it is to be noted that the present system utilizes a "blank" character comprising all zeros as will be apparent from the subsequent discussion; however, it should be noted that it would be possible to modify the system at some expense in recognition hardware and the like to recognize and work with "blank" characters such as all ones or various combinations of zeros and ones. However, use of the all zero "blank" character provides the simplest and most direct method of implementing the present system.

The invention will now be more particularly set forth and described with references to the figures in which FIGURE 1 is a simplified block diagram showing the major components of the system in block form insofar as their primary function is concerned. In this system, high speed delay line 10 is shown having a sense amplifier 12 and drive amplifier 14 connected thereto. Block 16 labeled Consecutive Blank Detection Circuitry performs the function of locating a suitable place in the delay line where a new message may be inserted. The delay block 18 is for the purpose of detecting two blank locations and is functionally related to block 16 as will be more fully described subsequently. Delay block 20 together with the switching arrangement 22 performs the function of delaying a part of the contents of the memory while a new character is being inserted therein. This delay is removed from the line as soon as the Blank Detection Circuitry has noted that at least two consecutive "blanks" follow a given message segment which is currently being delayed to allow the insertion of such new character.

Block 24 indicated by the legend Record Address, Blank and End Of Message, actually comprises two character length delay lines which upon demand by the control circuitry cause individual characters coming through the memory system to be compared with the contents of these delay lines for the production of appropriate compare signals. For example, the "record address" and "blank" detection portions determine whether or not a new message is being inserted into the delay line or whether a message whose input thereto has already begun is to be further continued. The End of Message compare circuitry provides an output signal whenever an "end of message" character is detected and partially enables the gating out of a particular message from the system through the AND circuit 26. The other input to this AND circuit is provided by a "read out" instruction from the central computer when it is ready to accept a new message or instruction.

Block 28 labeled Input Mode Detection and Timing Circuitry comprises a plurality of flip-flops, single shots and timing pulse means which, together with the inputs from blocks 24 and 16, provide the proper controls for ultimately sensing when information can be stored in said delay line, gating said information thereto through AND circuit 30 and dot OR 32 and further, determining when information already stored is to be delayed a character length through delay circuit 20 as previously stated or allowed to pass straight through via switch 22. The block labeled Input Location actually comprises two character length delay lines one of which is one of the delay lines indicated schematically in block 24. Referring momentarily to FIGURE 3, the delay character register labeled "M" at the input station compares its contents with characters stored in said main delay line memory 10 while the block labeled "N" is for the purpose of actually reading information into the delay line.

The description of the manner in which information messages are stored in the system will be explained by referring to FIGURE 2. In this figure, in the five views, *a–e*, a segment of the delay line is being observed on five subsequent cycles wherein it is desired to store a new message unit labeled $RA_4$. It will, of course, be realized that this represents but an extremely small section of the total delay line and that each of the blocks represents a character storage area, i.e., having 6 bit positions therein. It will further be noted that the character locations on the various views of the tape have been numbered above view *a* as positions 1–13 merely for purposes of convenience in describing the message inputing operation.

Assuming that it is desired to insert a new message into the system, an appropriate "record address" is supplied to the input station as well as a "blank" character which is required of the system to initialize a new message input routine. Assuming further that this request is made at the time bit position 1 is passing through the sense amplifier, the circuit detects two consecutive "blank" locations at positions 1 and 2. The circuitry maintains the "blank" at position 1 as it is always required to precede every "record address" with a "blank" location and stores the particular "record address" $RA_4$ in bit position 2. Since three "blank" character locations follow the bit position 2 wherein $RA_4$ is stored before the next message $RA_3$, the said message $RA_3$ will be maintained in its current location beginning with bit position 6. After this, the contents of the input station are altered so that the "record address" $RA_4$ and the first character to be stored therewith are present at said input station. Since this is a continuing message upon the next revolution or cycle of the recirculating memory, this circuitry locates the just stored address $RA_4$ and stores the first character $C_1$ of its associated message unit at position 3. Since there are two "blank" locations between bit position 3 wherein character $C_1$ is stored and position 6 where "record address" $RA_3$ is stored, there is no shifting of $RA_3$ upon this cycle, i.e., FIGURE *c*. The system having inserted character $C_1$ calls for a new character at the input station which is $C_2$, concurrently, the memory recirculates and "record address" $RA_4$ is again detected. At this time the character $C_2$ is inserted in position 3 adjacent $RA_4$ and previously stored character $C_1$ is delayed one character and stored in position 4. Since two "blank" characters previously to the storing of $C_2$ followed character $C_1$ and a "blank" may still remain in position 5 after the storage of $C_2$, it is not necessary to at this time delay the message beginning with $RA_3$. Accordingly, $RA_3$ is again stored or is continued beginning position 6. Assuming now that character $C_1$ and $C_2$ constituted the present message being stored and a special "end of message" character will be placed in the input location, the same procedure follows wherein the "record address" $RA_4$ is detected and the "end of message" character $EOM_4$ is stored immediately adjacent thereto and the two message units $C_2$ and $C_1$ are shifted back one space. At this time, the circuitry detects that if the message beginning with $RA_3$ was stored at character position 6, the rules of this system would be violated and accordingly, senses this condition and shifts back the message beginning with $RA_3$ one space until two consecutive "blank" characters following the last character of this message, i.e., $C_1$, are detected and the message character $C_1$ of $RA_3$ will now be stored at location 10 rather than 9. It will be noted that $RA_3$ has been shifted back one character position from 6 to 7 as are all of the other elements of this message.

Figure 2:
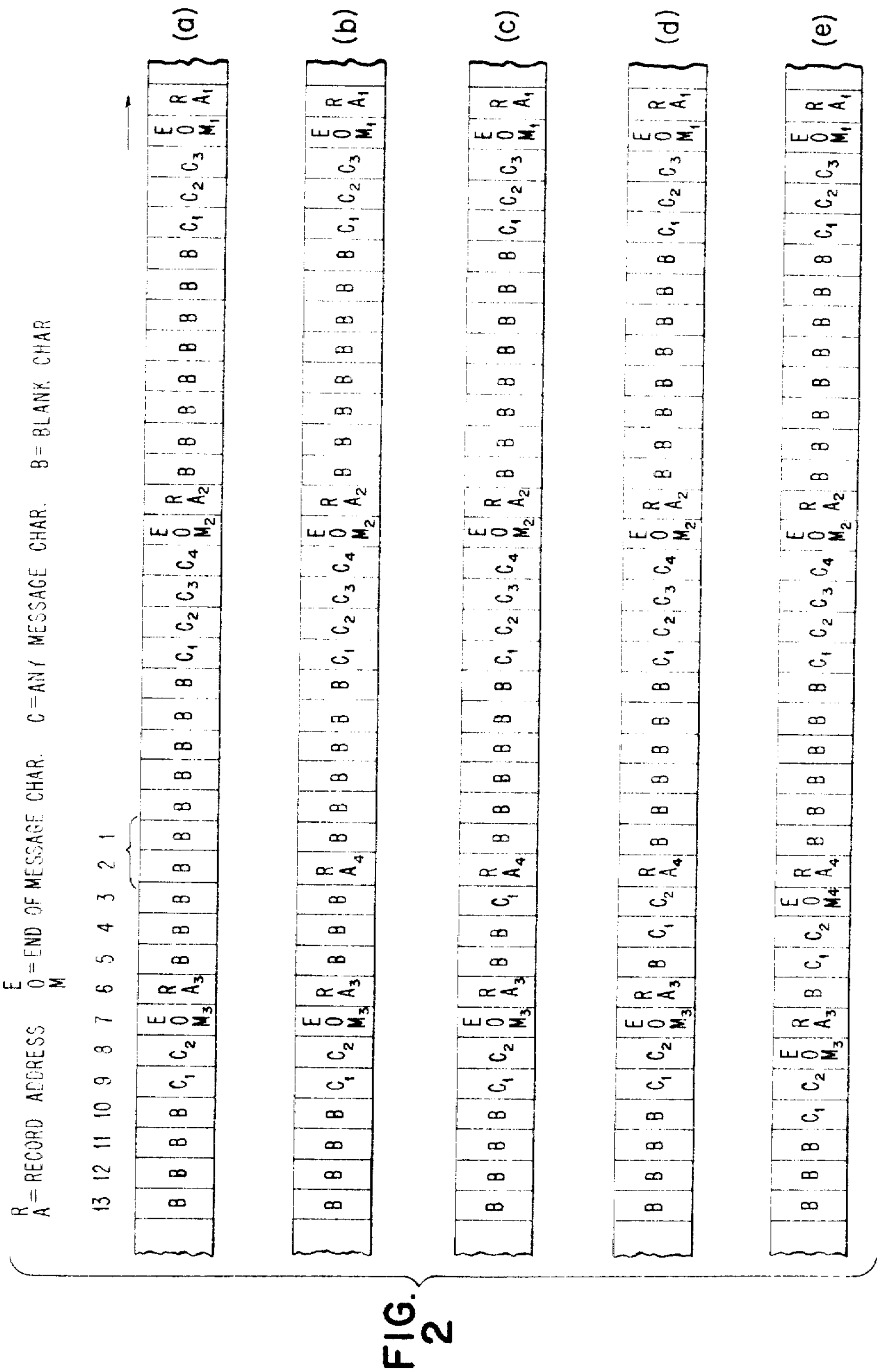
FIGURE 2 is a diagrammatic illustration of the way in which a message is stored in said memory and said memory is subsequently modified as additional portions of the message or a new message are inserted therein.

From the above discussion and description of FIGURE 2, the operating characteristics of the system insofar as the manner in which messages are handled should be fully understood. The two possible conditions of inputing a message having been described, i.e., the first condition where a new message having a new "record address" is to be initiated, which is illustrated in the section *b* of the figure. The second situation where an initially started message is to be continued is, of course, illustrated in the discussion of FIGURES *c*, *d* and *e*.

When a "read out" occurs, the only difference in the actual configuration of the memory would be that "blank" characters would replace the entire message previously stored therein. For example, if the message beginning with $RA_2$ were to be read out, the characters $RA_2$, $EOM_2$, $C_4$, $C_3$, $C_2$ and $C_1$ would all be replaced by "blanks." As will be apparent from the subsequent specific description of the FIGURE 3, the "end of message" characters are continuously being searched for by the circuitry and a suitable signal developed and fed to an output gate which will cause any given message to be read out of the system when the central computer calls for a new message.

It should be understood that the above description of the data inputing operation of the present invention has been shown at a particular location in the memory loop and that such an input operation is possible at any place in the loop where the system locates two "blank" characters. Thus, when a message recording cycle is initiated, it could be at a location completely removed from any other message wherein no subsequent shifting of previously stored data is necessary or it may be initiated in two "blank" spaces immediately between two existing messages wherein each time a new character is input into the memory all of the other data following said character would have to be shifted back a space until a location where two consecutive "blank" characters exist is detected. Thus, it may be seen that the present system is an extremely flexible and versatile one in which a very large number of messages originating from a wide diversity of sources may be stored in the memory in an unallocated manner and with no substantial limitation on the length of any one message. All the output of the instant system is done strictly on a demand basis as mentioned previously wherein the first complete message detected is gated out after the occurrence of a computer "read out" signal. It will be understood that it would be within the knowledge of a person skilled in the art to provide extra detection and compare circuitry for read out operations wherein a specific "record address" could be searched for if desired.

Having thus generally outlined and described the operation of the present system in terms of the manner in which information is initially and subsequently stored in the system and the manner in which information is "read out" thereof, there will now follow a specific detailed description of a preferred embodiment of the invention with reference to FIGURE 3.

In the specific embodiment of FIGURE 3, the main memory loop 10 as stated previously constitutes a recirculating high speed sonic delay line. The individual input station contains two additional character length delay lines "N" and "M" fully character synchronized with said main storage. The "end of message" detection circuit also is comprised of a character length delay line for the permanent storage of the system "end of message" character. These individual character length delay lines could conceivably be replaced by registers, however, since the main memory and these individual small capacity memories are both delay lines and are serial in nature, comparison operations may be achieved through simple exclusive OR circuits wherein an output from said exclusive OR at any point indicates a "no compare." The exclusive OR circuits as just referred to are indicated by reference numerals 40 and 42. As stated previously, one side of these exclusive OR's is fed by the character length delay lines marked E.O.M. and "M." These character length delay lines, as stated previously, are character synchronized with the main memory loop, that is to say, that each time a new character passes through the loop, the delay lines begin a cycle. As will be understood, the character stored both in the memory loop and in the individual delay lines consist of binary bits, i.e., "ones and zeros." As long as a character match occurs, there will be equal inputs, i.e., bits, to the exclusive OR circuits and thus no output. However, the first time a binary "one" appears on one line with a "zero" on the other, there will be an output of the exclusive OR. The detection circuit used in the instant embodiment is a flip-flop whose state is reset by the occurrence of a "no compare" in the associated compare circuitry.

Thus, by using delay lines for both the main recirculating high speed serial memory and also the individual character registers and suitably synchronizing same by means not shown but well known in the delay line arts, the step of comparison of characters is greatly simplified over conventional memories using standard core memories and compare registers. However, as stated previously, other forms of compare circuitry could equally well be used in the present system without departing from the scope of the invention.

It will be further noted that similar reference numerals are utilized in FIGURE 3 to refer to individual parts of this system which have been specifically shown in the general schematic block diagram of FIGURE 1.

The following general description of the major functional units of the logical circuitry shown in FIGURE 3 will generally describe the areas of said circuitry which performs the significant operations of this system. For the designation of the various abbreviations utilized in the subsequent description, a reference should be had to the table of nomenclature on FIGURE 3. $FF_1$ and $FF_2$ together with $D_{C1}$ perform the function of checking for two consecutive "blank" characters occurring in the data stream of the memory loop at any given time. $FF_2$ in combination with $FF_{2'}$ check for the occurrence of two consecutive "blank" locations once a data input cycle has been initiated and the output of $FF_{2'}$ determines when characters in the delay line subsequent to the newly inputed character no longer need be delaped by one character length. $FF_3$ together with a "blank" character in the input station register "M" initiates a new message storage routine upon the detection of the two "blank" characters. $FF_4$ together with a "record address" stored in register "M" initiates a continuation of the storage of a message previously initiated. The said output of both of these flip-flops feed into a common OR gate 43 which controls the setting of $FF_5$ which in turn gates a character to be stored from the input register "N" through the AND gate 30 and into the memory loop through OR gate 44. The AND gate 30 is enabled by the single shot $SS_C$ which provides a character length pulse upon the receipt of a signal from said output of $FF_5$.

The sections of the circuitry controlling output are the E.O.M. character register, the exclusive OR comparison gate 40, $FF_6$ and $FF_7$. The "set" output of $FF_6$ is fed indirectly to set $FF_7$ upon the occurrence of any "end of message" character detected in the line. When such an "end of message" character is detected concurrently with a "read out" request indicated as "Read Out Message" from the computer fed into AND gate 46, $FF_7$ is set, thus gating the message in the line out through AND gate 48 on the "Message Out" line. Concurrently with the setting of $FF_7$, AND gate 57 is no longer enabled due to the setting of $FF_7$. A RESET input into AND gate 57 is provided to permit the delay line to be completely reset prior to entering messages.

The basic timing pulses for this system comprise a pulse $t_x$ which occurs at the start of any character in the memory loop and a pulse $t_y$ which occurs concurrently with the end of a character time in said memory loop. Any convenient source for providing these pulses may be provided such as a multivibrator synchronized with the bit repetition rate in the memory loop together with suitable counters or any other well known system for producing such timing pulses.

A pulse source is indicated schematically as block 52 in FIGURE 3 having the two outputs $t_x$ and $t_y$. The "input station" including the two delay line registers "M" and "N" would preferably be fed by a suitable character buffer (not shown) which in turn receives information from a multiplexing system which interrogates the terminal units, transmits the messages and sequentially supplies to the "input station" the information or messages to be stored a character at a time in accordance with "have stored" instructions from the present system.

The specific functions of the various character delay blocks $D_{C1}$, $D_{C2}$ and $D_{C3}$ will be apparent from the following specific description of input routine for both a new message and a continuing message as will be the specific function of the bit delay blocks indicated as $D_B$.

There will now follow a specific detailed description of the operation of the control circuitry of FIGURE 3 relative to the three modes of operation of the device, i.e., starting a new message, continuing a message and reading a message from memory.

STARTING A NEW MESSAGE

For the initiation of a new message, it will be assumed that the main memory loop 10 contains all "blank" characters and that the "input station" contains a "blank" character in the "M" register and a "record address" in the "N" register. In this case, the system is looking for two consecutive "blank" characters in the main memory loop 10. Also, the "input station," register "M," will contain a "blank" character which will be checked for coincidence with the loop. As stated previously, the exclusive OR circuit 42 compares the contents of the register "M" with any character passing through its connection to the main memory line. The two flip-flops $FF_1$ and $FF_2$ are set at the start of each character time $t_x$ and will be reset only if a binary "1" passes in the loop at any time during the character. It will be remembered that from the previous explanation, a "blank" character contains all zeros, therefore, the flip-flops will remain set unless some other character, i.e., one containing a binary "1" passes by their particular sampling stations during the character time. These two flip-flops are separated by a character length delay line $D_{C1}$ which will obviously delay any character passing therethrough by a character time. Therefore, it will be seen that the only time the outputs of flip-flops $FF_1$ and $FF_2$ could both be "1" would be if two consecutive "blank" characters pass through the delay line at this sampling time. Concurrently, it will be remembered that the "input station" character register "M" contains a "blank" character therein and compares this "blank" continually with characters passing through the delay line through the exclusive OR circuit 42. Now it will be seen that at the same time $FF_2$ is looking for a "blank" character, compare circuit 42 is similarly comparing for same. The exclusive OR circuit 42 feeds into the reset flip-flops $FF_3$ and $FF_4$ in the event that a "blank" character is not passing through the delay line. $FF_3$ is set every $t_x$ time and if it is still set at the end of character time $t_y$ and concurrently, both $FF_1$ and $FF_2$ are still set to "1" at time $t_y$ producing outputs X and P. Then AND circuit 54 will be enabled and provide an input to OR circuit 43 which sets flip-flop $FF_5$ through the one-half bit delay 56. At the instant when $FF_5$ is set, the two aforesaid "blank" characters will currently be in the character delay blocks $D_{C1}$ and $D_{C2}$. When $FF_5$ is set by the output from $FF_3$, the "blank" character in $D_{C1}$ will be steered through character delay block $D_{C3}$ by virtue of the enabling of AND gate 58, at the same time AND gate 68 is disabled due to the setting of $FF_5$. Concurrently, the single shot $SS_C$ which produces a character length pulse indicated by the $\overline{Q}$ enables AND gate 30 and gates the new "record address" stored in the "N" character register at the input station. The output of the single shot $SS_C$ also serves to reset the two character registers "N" and "M" with a new message character and "record address" respectively, through suitable gating circuitry (not shown) to the input registers.

$FF_5$ will now remain set until the logic circuitry detects a second set of two "blank" characters in the memory loop. As long as $FF_5$ is set, no other data can be read into the loop. This is accomplished by inhibiting the reloading of the input stations "N" and "M" while $FF_5$ is set. Since this is a function of the input station control, it is not specifically shown, however, the means for the gating of two new characters into said station would be well known in the art.

It will be noted that with $FF_5$ set, the delay block $D_{C3}$ is connected in the line and every character coming through the line subsequent to the setting thereof will be delayed by the one character position. It is apparent that it is necessary to reset this portion of the system as soon as possible. As stated previously, the condition for reset at $D_{C3}$ occurs when the next two "blanks" occur in the memory loop subsequent to the time at which the new data is entered therein. Because of the requirement that at least one "blank" precede every "record address" R.A., it is necessary to again examine the data in the loop for two "blank" character positions which will effectively be merged at the time when AND circuit 58 is opened and AND circuit 60 again closed by the resetting of $FF_5$. This condition is detected by flip-flop $FF_{2'}$ which is operated by the output of flip-flop $FF_2$. Thus, assuming two "blank" characters are moving down the line at the starting time of the first of said characters $FF_2$ will be set by pulse $t_x$ thus providing a set output for said $FF_2$. At time $t_y$, the AND circuit 62 is enabled by pulse $t_y$ producing an output which will pass through the one-half bit delay $D_B$, 64. It will be noticed that this delay will produce an output at substantially the starting time ($t_x$) for the second "blank" character and will thus set $FF_{2'}$. Since this second pulse is also a "blank," $FF_{2'}$ will remain set and will produce an output Y when AND gate 66 is enabled at time $t_y$ or the turn-off period for this second "blank" pulse. When Y is a "one" at time $t_y$, the aforesaid two "blank" characters are currently stored in character delays $D_{C3}$ and $D_{C2}$. However, at this time, the output Y provides an input to the AND circuit 68 feeding the reset for $FF_5$ thus resetting same and, in fact, the "blank" character stored in $D_{C3}$ is lost or may be considered merged with the first "blank" character which is already in $D_{C2}$. Thus, with this circuitry, it may be seen that at least one "blank" character will be maintained between the end of a previous data string which has been delayed through $D_{C3}$ and any succeeding data string which may succeed the just detected and merged two "blank" characters.

This latter description of the "blank" character sequence detection by the flip-flops $FF_2$ and $FF_{2'}$ to control the removal of the delay block $D_{C3}$ from the system is the same with the message continuation routine which will be set forth subsequently. It will thus be seen as set forth in the description of the data manipulation illustrated in FIGURE 2 that either: (1) No actual message characters will be delayed by the insertion of delay $D_{C3}$ where only the initial "record address" is being inserted in the memory. (2) Subsequent characters in the individual message will be delayed as in FIGURE 2*d* and/or (3). Both individual characters within a message and subsequent strings of data or messages may all be delayed by one character position before the next two "blank" characters are detected.

Actually, the statistical possibility of this latter occurrence illustrated in FIGURE 5*d* occurring is very slight due to the rather large storage capacity of the system, however, it will be seen that the instant circuitry may satisfactorily take care of this contingency also.

CONTINUING A MESSAGE

For this sequence, it will be understood that at least the particular message "record address" is already stored in the memory loop and that possibly more characters of this message may be stored. In any event, what the system must do in this case is detect the location of the particular desired "record address" immediately subsequent to which the new character will be stored and the remainder of the message delayed until the next two "blank" characters are detected at which point the delay is removed from the memory loop. As stated previously in the specification, for this particular mode of operation, it will be understood that the "record address" has now been shifted to the "input station" compare register "M" and that the character which is to be inserted is stored in the register "N." At this point, the system no longer has to look for the initial two "blank" locations before it can start a memory cycle but only needs to locate the desired "record address." This is done through the compare circuitry comprising the register "M" and the exclusive OR circuit 42. It must be remembered at this time that each "record address" is preceded by a "blank" character which as previously stated is detected by the fact that $FF_2$ is not reset thus producing a set pulse to $FF_4$ at a time one-half bit delayed from time $t_y$. Now, assuming that the "record address" being sought is currently passing through the loop at the detection point of the compare circuit 42, $FF_4$ will remain set and at the time $t_y$ of said "record address," $FF_5$ will be set after the half bit delay of block 56. At this time, the "record address" just looked at in the loop is in $D_{C2}$ and the next loop character is in $D_{C1}$. When $FF_5$ is set, the next loop character is shifted through $D_{C3}$ while the character stored in input station register "N" will be inserted in the memory loop at the OR circuit 44 in the next character location immediately subsequent to the "record address." The removal of the delay $D_{C3}$ through the output of $FF_{2'}$ upon the occurrence of two "blank" locations in the message unit operates in exactly the same way as described previously.

The previous two descriptions of the inputing operations completely sets forth the operation of the present system insofar as the inputing of data into the system is concerned. It should be noted that at the end of a particular message input, the special "end of message" (E.O.M.) character will be inserted in the "N" register and stored in the memory in exactly the same manner as any message character. When any message has ended, the multiplexing arrangement not shown will automatically gate new message information from a different terminal set to the "input station."

READING A MESSAGE FROM MEMORY

In describing the "read out" operation, it will be remembered that any message in memory has a special "end of message" (E.O.M.) character stored adjacent the particular "record address" for that message. The special character length recirculating delay line shown in the block labeled EOM in the left hand portion of the figure together with its associated exclusive OR circuit 40 as stated previously, serves to continuously scan the memory loop for such "end of message" characters. Thus, with the occurrence of an "end of message" character, the flip-flop $FF_6$ which is initially set at every character time $t_x$ will produce a one-half bit delayed output pulse G when an "end of message" character passes the interrogation point in the delay line. At any time when a pulse G is obtained, a "record address" character will be in delay $D_{C2}$ and the E.O.M. character will be in delay $D_{C1}$. At this time $FF_7$ may be set through the AND gate 46 by the input G from $FF_6$ and a speial "read out" message command signal from the central computer or other message utilization source. As will be seen, the output of $FF_7$ enables AND circuit 48 and disables AND circuit 57 so that the message beginning with the particular "record address" is immediately gated out of the loop. $FF_7$ is reset to discontinue gating out of the loop by the occurrence of the next "blank" character after the desired message passes by its reset source point. The "blank" character prevents the resetting of $FF_2$ after its initial setting by the $t_x$ pulse and accordingly, a one-half bit delayed pulse $X_1$ is produced concurrently with the storage of said "blank" in $D_{C2}$. The pulse $X_1$ resets $FF_7$ and the "blank" pulse emerging from $D_{C2}$ is recirculated in the memory together with all subsequently stored information. It should be also noted that the message read out is automatically replaced by "blank" characters in the loop.

The above description of the three operating modes for the preferred embodiment of the invention as set forth in FIGURE 3 clearly describes the operation of the device and illustrates the flexibility of the manner in which the system can operate. It should further be noted that the capacity of the memory loop 10 can immediately be doubled, tripled or quadrupled, or generally increased by any desired number of complete characters by the insertion of further delay line memory capacity substantially the same as the loop 10 immediately preceding the drive amplifier. The same control circuitry could be used and the same speed of data transmission maintained within the loop. However, if, for example, two loops were used, it would take twice as long for a complete memory cycle and for the complete searching of the entire memory as with the single loop. However, all of the present circuitry could be utilized with no other problem than the provision of a longer time period for a complete search which would in all probability reduce the speed with which incoming stations could be interrogated since a memory cycle would accordingly require a longer period for completion.

Figure 4:
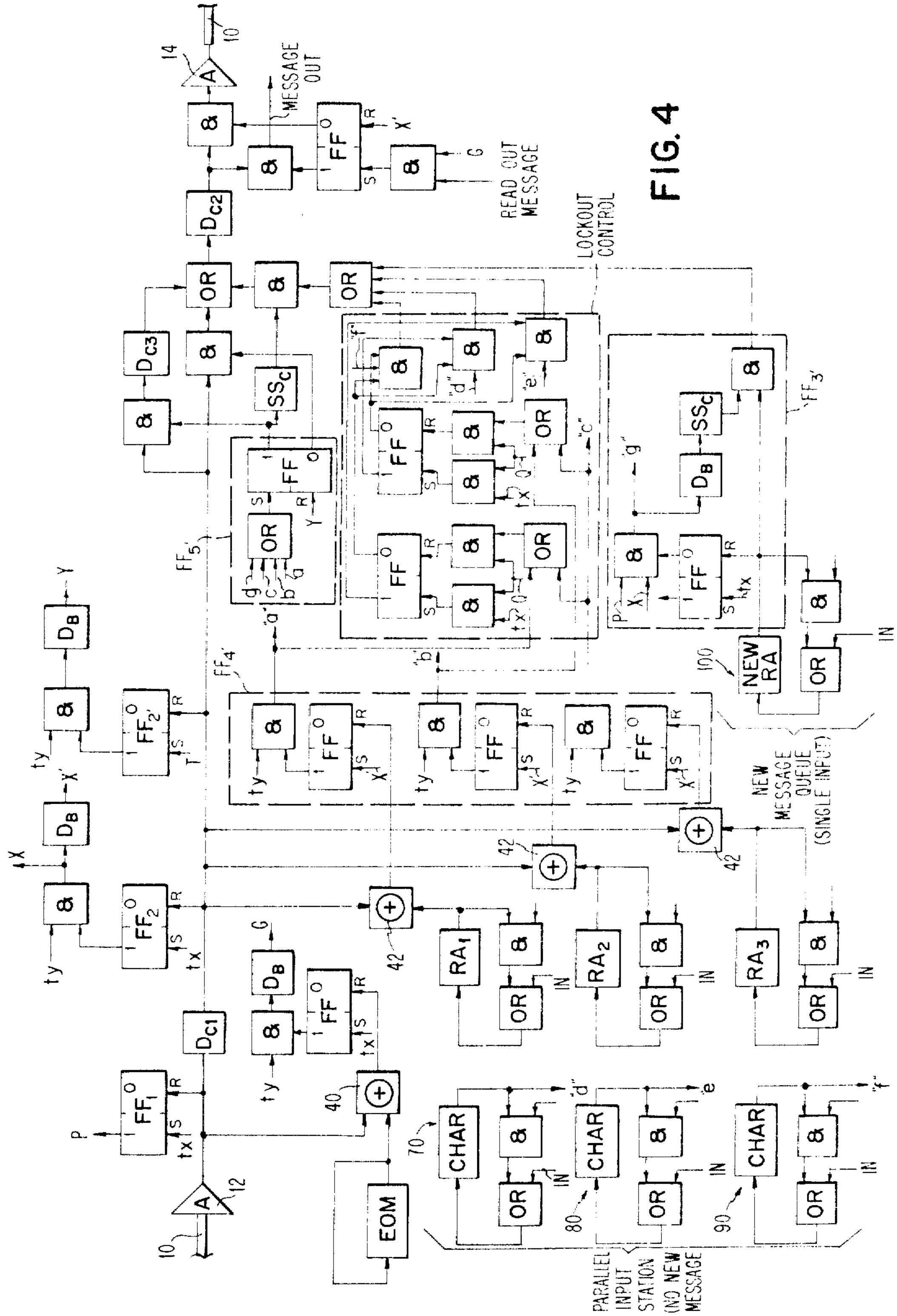
FIGURE 4 is a logical schematic diagram of a modification to the circuitry of FIGURE 1 wherein a plurality of inputs to said memory are utilized.

It should also be noted that the concepts of the present system could be utilized in, for example, the circuitry shown in FIGURE 4, wherein it is seen that a plurality of parallel input stations wherein no new messages were being searched for could be easily utilized together with a single new message input queue station. The individual parallel input stations wherein no new message units are supplied, i.e., 70, 80, 90 would each contain a different "record address" and a different character, said character being either a message character or an E.O.M. character. The information to these stations would be supplied by an input character register (not shown) which would transfer the "record address" into one of these registers after a new "record address" has been input through station 100.

Before proceeding further with the explanation of this particular embodiment of the invention, it will be remembered that each individual "record address" can appear only once in the memory loop, therefore, the insertion of any one character in a memory loop in a particular cycle may be started and completed in the passage of just those characters involved in that particular message unit. Therefore, there is nothing to prevent the next message unit from having a character inserted therein. The system of FIGURE 4 takes advantages of this characteristic of the memory organization. The only thing that must be remembered is that if data is being shifted through the delay line $D_{C30}$, a further input operation cannot occur until this delay has been removed from the system. All of the logical blocks in FIGURE 4 have not been specifically numbered as they are largely the same and operate in substantially the same manner as that of FIGURE 3. Wherever possible, the same reference numerals have been used in FIGURE 4 to enable a ready comparison of the operation of the circuit of FIGURE 4 with FIGURE 3. It will be noted that four dotted areas are included in the drawing of FIGURE 4, the first of these is denoted as $FF_{3'}$. This particular circuit operates in substantially the same manner of $FF_3$ in FIGURE 4, that is to say that it functions during the inputing of a new "record address" into the system when two "blanks" have been detected by the flip-flops $FF_1$ and $FF_2$. The three flip-flops indicated as $FF_{4'}$ operate in substantially the same manner as the individual flip-flop $FF_4$ in FIGURE 3. That is, it provides for the insertion of a continuing message once a prescribed "record address" has been located and further provides together with the remainder of the circuitry, i.e., flip-flop $FF_{2'}$, to introduce the delay $D_{C3}$ into the system where necessary and remove it when possible. The block included in the lockout control insures that only one "record address" can be supplying information into the system while the delay $D_{C3}$ is still inserted in the circuit as set forth above. It will be noticed that the outputs from the three flip-flops in $FF_{4'}$ are routed into this block to control the gating of the actual characters in the character register 70, 80 and 90 through inputs D, E and F into the AND circuit at the bottom of this block. The setting and resetting of these flip-flops in the lockout control as will be seen is governed by the input queue to the two AND circuits in both the set and reset lines to each flip-flop. This output queue is the reset output pulse of the block $FF_{5'}$ which operates in substantially the same manner as $FF_5$ in FIGURE 3. As will be remembered, the flip-flop $FF_{5'}$ cannot be reset until the output Y is obtained from $FF_{2'}$ which states that there have been an occurrence of two "blank" characters after the input location has been detected which then allows the removal of the character delay $D_{C3}$ from the main memory loop. The remainder of the system operates in substantially the same manner as FIGURE 3 and a repetition of the specific details of the circuitry would merely be redundant at this point, i.e., the actual mechanics of the storing of a new message, continuing a previously started message and reading out a message progress in substantially the same fashion as in the circuit of FIGURE 3. The primary difference being that in a given memory recirculating cycle as many as four characters could be inserted into the loop providing there was no packing conflict, i.e., the occurrence of a shift of an existing message string in which it is desired to put data, which shift was occasioned by the inputing of data into a previous message string in the loop.

The number of input stations for continuing messages which could be added on to the system as suggested in FIGURE 4 is relatively unlimited, the primary consideration being one of economic statistics to determine how many are necessary to take care of the particular queuing problem of a particular input station. As stated, the method of introducing characters into these various stations would be by some convenient multiplexing arrangement (not shown) which would simply provide a new character for the system each time an existing character was read out as would be provided by any convenient gating signal which could be obtained from the system as suggested in FIGURE 3.

While the system has been particularly pointed out and described with reference to the preferred embodiment of FIGURE 3 and the expanded embodiment of FIGURE 4, it will be understood that any number of changes could be made in the particular logic circuitry of the system without substantially departing from the spirit and scope of the invention. For example, means could be utilized to store the message in original rather than reverse order by changing the order into which the message units are fed into the input stations.

As suggested previously, other input station character registers than the specific delay lines suggested could be used, however, it is submitted that this type of character length delay line when properly synchronized with the main multiple character delay line of the main memory makes many serial operations such as serial memory extremely simple and inexpensive of construction. It should further be noted that some other sort of serial memory could be used such as possibly a core memory wherein serial read in and read out were utilized or even a mechanical memory such as a magnetic tape.

A number of modifications and improvements could also be made in the particular circuitry shown to improve the operation and reliability of the system. For example, means could be provided in conjunction with the character search register "M" wherein a timing arrangement would be provided so that once a complete memory recirculation cycle has occurred with no "coincidence," a suitable signal would be provided and a new character gated into the register "M" together with an indication that the previous information was incorrect. Any number of error detection circuits could also be incorporated in the system by a person skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An information storage system wherein multiple character messages may be stored in unallocated storage positions and be of variable field length wherein each message begins with a specific "record address" character which identifies a particular message and wherein only one such "record address" character is associated with any one message, said system comprising:

(a) a high-speed serial main memory comprising a recirculating storage loop;

(b) means for continuously recirculating the contents of said loop and for erasing same at any desired time;

(c) input register means selectively connectable to said loop for inputing new data thereto;

(d) means for continuously scanning said loop for a minimum number of available storage locations to ascertain at which point new data is to be inserted;

(e) means for entering the new data at said point regardless of information stored in the loop subsequent thereto;

(f) means for inserting a delay in said loop for delaying previously stored data in said loop subsequent to said input point if insufficient "blank" storage locations are available to store a segment of new data without interfering with said previously stored data;

(g) means to scan said loop for a sufficient storage availability condition of said loop subsequent to the entry point of said new data, and (h) means actuable in response to said last said means to remove said delay from said loop.

2. An information storage system as set forth in claim 1 wherein said high-speed serial main memory comprises a high-speed delay line having suitable amplification means for continuously recirculating data therein.

3. An information storage system as set forth in claim 2 above including means for always maintaining a "blank" character prior to any "record address" character in said system said means comprising:

(a) circuit means for scanning the storage loop for two adjacent "blank" characters when storing a new "record address" said means further being actuable to delay the second of said detected "blank" characters while said new "record address" character is transferred from the input register means into said memory loop, and (b) means to insure that at least one "blank" character follows every message unit in said loop comprising;

(c) means for detecting two consecutive "blank" characters following a character position in said loop in which the new message character is being inserted; said means being actuable to remove said aforementioned delay from said loop while the second of said "blank" characters is stored therein whereby said second "blank" character is effectively removed from said loop.

4. An information storage system as set forth in claim 3 above, said system being characterized by the fact that every complete message in said group contains a special character indicative of the fact that its associated message unit is complete and susceptible of readout; said special character appearing adjacent to the "record address" character of its particular message unit;

(a) means for continuously scanning the loop for such "end of message" characters and for providing an indication of the existence of same at a particular point in said loop;

(b) means for delaying said loop so that all of the message preceding said special character remains within the system prior to the readout point;

(c) means for gating said message out of said loop just subsequent to said delay means;

(d) means for replacing the information read out with "blank" characters;

(e) means for sensing a "blank" character immediately following a message being read out of the loop, and (f) means for closing the loop upon the sensing of said "blank" character following the last character of the message being read out.

5. An information storage system as set forth in claim 4 wherein the means for detecting the "blank" character following the message being read out comprises:

(a) means to set same to a first state;

(b) a flip-flop circuit at the beginning of a character sequence;

(c) means to reset said flip-flop on the occurrence of any character other than a "blank" passing a reset connection to said flip-flop during a given character time;

(d) means for interrogating the condition of the flip-flop at the end of a character time, and (e) means responsive to the set condition of said flip-flop to close said loop.

6. An information storage system as set forth in claim 5 above wherein the means for inserting a new "record address" in the storage loop comprises:

(a) a first comparison means including two flip-flop circuit means for sensing the presence of two consecutive "blank" locations in said memory loop and for producing an output indicative thereof;

(b) second compare register means for specifically identifying the first of said "blank" characters and producing a second output indicative thereof;

(c) means responsive to said combining means for combining said outputs to allow the first of said "blank" characters to continue circulating in the loop and for delaying the second of said "blank" characters in delay circuit means and for inserting the new "record address" into the loop just subsequent to said first "blank" character;

(d) means including a third "blank" character detection flip-flop for developing a signal when two consecutive "blank" characters following the insertion point for said new "record address" occur in said data loop circuit.

7. An information storage system as set forth in claim 6 above wherein the means for continuing a message subsequent to a previously stored "record address" includes compare register means for detecting said "record address" in said loop and means responsive thereto to insert a delay in said loop immediately subsequent to said "record address" and for gating a new message character in said loop at a point directly subsequent to said "record address" and for maintaining said delay serially in said loop until said means for detecting the two subsequent "blank" characters detects said condition at which point said circuit operates to remove said delay from the loop.

8. An information storage system as set forth in claim 7 above including:

(a) plural compare register means for concurrently searching the loop for a plurality of previously stored record addresses therein;

(b) means responsive to a compare by any of said compare register means actuable to insert said delay in said loop and to read an associated information character into said loop and for initiating the search for two "blank" characters to remove said delay from said loop, and (c) further means for preventing the initiation of any further storage cycles in said loop until said delay has first been removed.

9. An information storage and retrieval system for serially storing variable field length messages in an unallocated manner comprising:

(a) a high speed recirculating delay line constituting a main loop;

(b) first flip-flop circuit means connected to a first point in said loop for producing an output indicative of a "blank" character passing said first point;

(c) first character delay means connected in said loop between said first point and a second point;

(d) second flip-flop circuit means connected to said second point for producing an output indicative of a "blank" character passing said second point;

(e) third flip-flop circuit means having a reset control connected to said second point in said loop and having its set control connected to the output of said second flip-flop means;

(f) second character delay means selectively connectable between said second point in said loop and a third point in said loop;

(g) input register means comprising a storage register from which message characters may be gated into the main memory loop and a first compare register means connected to a first compare circuit;

(h) means actuable to place a "blank" character in said first compare register means and a special message identifying character in said storage register when the storage of a new message is to be initiated in said loop;

(i) said first compare circuit being connected between said first compare register and said second point in said loop;

(j) fourth flip-flop circuit means actuable in response to the output of said first compare circuit for producing an output indicative of a successful compare between said compare register and a character in said loop passing said second point therein;

(k) means responsive to concurrent outputs from said first, second and fourth flip-flop means to produce an output for setting;

(l) a fifth flip-flop circuit means, the set output of which causes said second character length delay circuit means to be inserted between said second and third points in said loop;

(m) pulse means actuable by the set output of said fifth flip-flop means for producing an output pulse for gating the contents of said storage register into the loop at the third point, and (n) means actuable in response to an output from said third flip-flop means to reset said fifth flip-flop means the reset output of which causes the second delay circuit means to be removed from the loop and initiates the gating of new characters to be stored into said storage and first compare registers.

10. An information storage and retrieval system as set forth in claim 9 wherein an additional message character is to be inserted in a message currently existing in said loop comprising:

(a) means for storing the special identifying character of the message into which the insertion is to be made in the first compare register means and for storing the message character to be inserted in the storage register means;

(b) sixth flip-flop circuit means for producing an output indicative of a concurrent compare with the contents of the first compare register and a delayed output from said second flip-flop means, the output from said sixth flip-flop means being actuable to set said fifth flip-flop means to set output of which effects the gating of the contents of the storage register into the loop at point three and introduces the second delay circuit means into the loop.

11. An information storage and retrieval system as set forth in claim 9 wherein the read out control circuitry for the system comprises:

(a) second compare register means having permanently stored therein a special "end of message" character which is stored with each complete message in the system;

(b) compare circuit means connected between said first point in said loop and said second compare register means;

(c) seventh flip-flop circuit means actuable in accordance with the condition of said compare circuit means to produce an output signal when a special "end of message" character passes point one in said loop;

(d) a third character delay circuit connected between said third point and a fourth point in said loop;

(e) eighth flip-flop circuit means;

(f) means for setting said eighth flip-flop upon the simultaneous occurrence of an output from said seventh flip-flop means and a "read out" signal from some external utilization device;

(g) switching circuit means located at said fourth point in said loop actuable by the "set" output of said eighth flip-flop means to open said loop and gate the contents thereof serially to external circuit means and actuable by the reset output of said eighth flip-flop to close said loop to recirculate the contents, and (h) means for supplying the delayed output of said second flip-flop circuit means to the reset input of said eighth flip-flop means to prevent further read out when the first "blank" character succeeding a message being read out is detected.

12. An information storage and retrieval system as set forth in claim 11 wherein said first, second and third flip-flop circuit means for detecting "blank" characters include:

(a) means for setting same the first bit time of a character period and wherein the means for resetting same comprises any binary "1" occurring in the loop at the point to which each said flip-flop is connected, and (b) means for interrogating the set output of said second and third flip-flop circuit means at the final bit time of every character period an output from which indicates that a "blank" character has just passed the respective flip-flop's position in the loop.

13. An information storage and retrieval system as set forth in claim 12 wherein said first and second compare registers and said storage registers comprise recirculating character length delay lines fully character synchronized with said main storage loop.

14. An information storage and retrieval system as set forth in claim 13 wherein said first and second compare circuit means comprise exclusive OR circuits each having an input connected to said first and second compare register means and having their other inputs connected to said second and first points in said loop respectively whereby an output from the exclusive OR circuits during any character period indicates a "no compare" with the contents of the associated compare register.

15. An information storage and retrieval system as set forth in claim 14 wherein said input register means comprises:

(a) a plurality of storage registers for storing message units of messages to be continued in the system and (b) a plurality of first compare register means associated with each said storage register means;

(c) a separate compare circuit means connected between each said compare circuit means and said second point in said loop;

(d) a separate flip-flop means connected to each said compare circuit means for producing an output whenever a successful compare occurs between the associated compare register and the character currently passing point two in the loop the output of any of said last named flip-flop means being actuable to set said fifth flip-flop means, and (e) lockout means for preventing more than one of said last named compare circuit flip-flops from producing a set pulse to said fifth flip-flop at any one time.

16. An information storage and retrieval system as set forth in claim 15 wherein a separate storage register is provided for a new message identifying character to be stored in said system, means combining the output of said fourth flip-flop means concurrently with outputs from said first and second flip-flop means to set said fifth flip-flop means to initiate a storage cycle for said new message identifying character.

References Cited by the Examiner

UNITED STATES PATENTS 2,978,680 4/1961 Schulte ---------- 340—172.5

ROBERT C. BAILEY, *Primary Examiner.*

W. M. BECKER, P. J. HENON, *Assistant Examiner.*